United States Patent [19]

Collier

[11] Patent Number: 5,036,593
[45] Date of Patent: Aug. 6, 1991

[54] TRAILER ALIGNMENT GUIDE

[76] Inventor: Vaughn T. Collier, 2401 Chestnut St., Montgomery, Ala. 36107

[21] Appl. No.: 519,153

[22] Filed: May 4, 1990

[51] Int. Cl.$^5$ .............................................. B60D 1/40
[52] U.S. Cl. .................................. 33/264; 116/28 R; 280/477
[58] Field of Search ....................... 33/264; 116/28 R; 280/477

[56] References Cited

U.S. PATENT DOCUMENTS

| | | | |
|---|---|---|---|
| 3,015,162 | 1/1962 | Bohnet | 33/264 |
| 3,363,318 | 1/1968 | Folkins et al. | 116/28 R |
| 3,866,328 | 2/1975 | Alexander et al. | 116/28 R |
| 3,889,384 | 6/1975 | White | 33/264 |
| 4,065,147 | 12/1977 | Ross | 280/477 |
| 4,541,183 | 9/1985 | McConnell | 33/264 |
| 4,614,356 | 9/1986 | Mills | 280/477 |
| 4,687,220 | 8/1987 | Danielson | 33/264 |

*Primary Examiner*—Thomas B. Will
*Attorney, Agent, or Firm*—Berman, Aisenberg & Platt

[57] ABSTRACT

A unitary trailer alignment guide for positioning a towing vehicle with respect to a trailer for connecting a trailer hitch includes a base, a telescoping upright member, a telescoping horizontal member joined at one end to the upper end of the upright member and rotatable through 270 degrees at the joint, and a vertical locator member at the forward end of the horizontal member, remote from the joint. In use, a trailer guide is mounted on a trailer. The lengths of the telescoping vertical and horizontal members are adjusted so that the vertical locator member will touch the towing vehicle when the trailer is aligned with the towing vehicle in position for connecting the trailer hitch.

7 Claims, 1 Drawing Sheet

U.S. Patent  Aug. 6, 1991  5,036,593
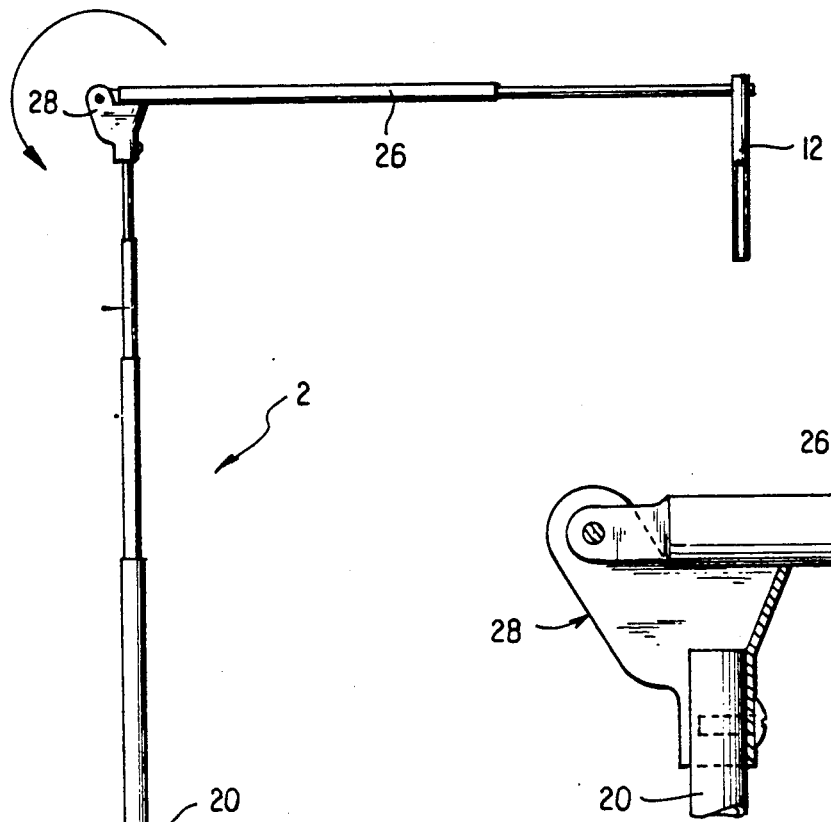
FIG. 2
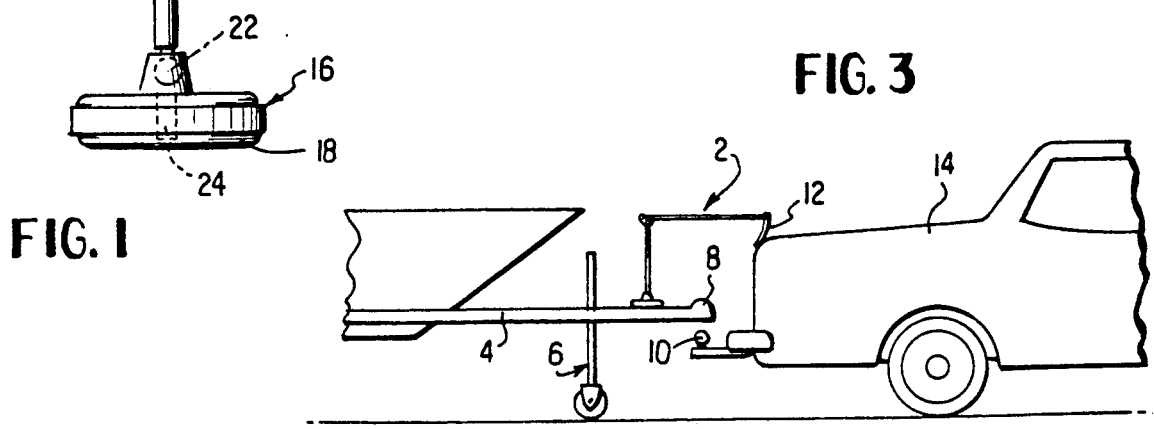
FIG. 1
FIG. 3

TRAILER ALIGNMENT GUIDE

FIELD OF THE INVENTION

The invention relates to a unitary trailer mounted guide for aligning a trailer with a towing vehicle for connecting a trailer hitch.

BACKGROUND OF THE INVENTION

Known alignment guides are of two parts—one vertically elongated part mounted on the trailer and the other vertically elongated part mounted on the towing vehicle. These guides are used by aligning the vertically elongated parts until they touch, to indicate visually to the driver of the towing vehicle that the vehicle is in position for joining to the trailer for connecting the trailer hitch. Such devices require that two separate parts be stored and that two separate parts be positioned for use. Such two-part systems are described in the following patents: Tague, U.S. Pat. No. 3,818,599; Lehtisaari, U.S. Pat. No. 3,918,746; Myers, U.S. Pat. No. 4,192,526; Miller, Sr., U.S. Pat. No. 4,313,264; Garrison, U.S. Pat. No. 4,583,481; Sand, U.S. Pat. No. 4,666,176 and Suter, U.S. Pat. No. 4,723,788.

A one-piece device marketed as the "TadPole" trailer alignment device, by Spectra Technologies of Arlington, Tex., includes a fiberglass pole strapped to the trailer hitch on the trailer. This device must be removed before the trailer hitch can be connected to the ball hitch on the vehicle since it covers over the socket on the trailer hitch into which the ball portion of the hitch fits. The lowest portion of the device, below the socket, touches the towing vehicle when the vehicle is in position for connecting the trailer hitch. The driver of the vehicle can see an upper portion of the device as he backs the vehicle into place, but cannot see where the vehicle and trailer alignment guide touch.

SUMMARY OF THE INVENTION

A unitary trailer alignment guide of the invention includes a magnetic base, a telescoping upright member, a telescoping horizontal member joined at one end to the upper end of the upright member and rotatable through 270 degrees at the joint, and a vertical locator member at the forward end of the horizontal member, remote from the joint. In use, a trailer alignment guide of the invention is mounted on a forward member of a trailer adjacent the trailer hitch. The lengths of the telescoping vertical and horizontal members are adjusted so that the vertical locator member touches an upper part of the towing vehicle, generally in view of the vehicle driver, when the towing vehicle is aligned with the trailer in position for connecting the trailer hitch.

It is an object of the invention to provide a unitary trailer alignment guide.

It is another object of the invention to provide a one-piece trailer alignment guide for mounting on a trailer when connecting a trailer hitch.

BRIEF DESCRIPTION OF THE DRAWINGS

FIG. 1 is a side elevational view of a trailer alignment guide of the invention.

FIG. 2 is a side elevational view of the joint shown in FIG. 1.

FIG. 3 is a schematic view of a trailer alignment guide of FIG. 1, in use.

DETAILED DESCRIPTION OF THE INVENTION

A one-piece trailer alignment guide of the invention is advantageous in that only a single piece needs to be positioned for use when required, and then stored. The device telescopes compactly for storage.

A one-piece trailer alignment guide for aligning a towing vehicle with a trailer for connecting a trailer hitch includes a magnetic base which is positioned on a forward end of the trailer to be hitched to the towing vehicle. The base includes a ball-and-socket joint for rotatably engaging a lower end of an upright first extensible elongated member generally includes telescoping sections for adjusting its length. A second extensible elongated member, generally also having telescoping sections for adjusting its length, is attached at one end to the upper end of the upright first elongated member by a joint enabling the second member to be rotated with respect to the first member. A rod or tube of rubber or plastic material is flexibly attached at an upper end to the other end of the second elongated member.

In use, the upright first extensible member is generally vertically positioned but may be positioned at an angle by rotating the member at the ball-and-socket joint. The second extensible member may be stored adjacent the first member and rotated to an angular position with respect to the first member. In a non-limiting example, the first member is positioned vertically and extended telescopically so that the second member, which is also extended telescopically, is positioned horizontally by rotating the second member to that position. A rubber or plastic rod or tube is attached to the end of the second elongated member remote from the first elongated member and hangs downward. The forward position of the rod or tube is adjustable by adjusting the length of the second extensible member by adjusting its telescopic sections.

The device is oriented forwardly so that, when the trailer is in position for connecting the trailer hitch, the lower end of the rubber or plastic rod or tube touches the towing vehicle. When that happens, the driver knows that the required relative positions of the towing vehicle and trailer have been achieved and the towing vehicle is in position for hitching to the trailer.

If a user regularly needs to position the same towing vehicle for connecting to the same trailer, a position for locating the base may be marked on the trailer member adjacent the hitch, the first and second members can be set to the required lengths and then folded together by rotating the second member at the joint, to lie adjacent the first member and stored with the elongated members at the correct extensions for the flexible rod or tube to touch the towing vehicle. Then, in use, the device is taken from its storage location, unfolded, and set up in the marked position on the forward trailer member adjacent the hitch, ready for the towing vehicle to be backed into position for connecting the hitch.

With reference to FIGS. 1 to 3, in which like numerals represent like parts, FIG. 3 shows device 2 located on forward member 4 of trailer 6. Device 2 is positioned adjacent and rearward of trailer hitch 8. Trailer hitch 8 is positioned substantially vertically above ball member 10 for connecting the trailer to the towing vehicle. In this position, flexible member 12, which may be a rubber or plastic rod, tube or other flexible member appropriate for this purpose, touches towing vehicle 14 substantially above the level of the trailer hitch.

As shown in FIG. 1, device 2 includes supporting base 16 which preferably includes magnet 18 for firmly positioning base 16 on forward member 4 of trailer 6, adjacent and behind trailer hitch 8. Extensible upright member 20 is connected by a ball-and-socket joint 22 to base 16. While member 20 is generally used in the upright position, ball-and-socket joint 22 enables it to be used in a slanted position if necessary. Screw 24 connects parts of the base together. Member 20 may be a mast, such as a telescopic television antenna made of chrome plated brass tubing, or of other material known in the art. In a non-limiting example, the telescopically folding mast may be 12 in. long at its shortest length and 48 in. long when fully extended.

Elongated member 26 is generally a shorter member than member 20, and may be a telescoping replacement antenna for a portable radio or other elongated member known in the art. If a telescoping antenna is used it may be an antenna which collapses to 4 in. and extends to 18 in. when fully extended. Such an antenna may also be made of chrome-plated brass tubing, or of other material known in the art.

The upper end of member 20 is connected to member 26 by joint 28 which may be a steel hinge bracket capable of rotating the members through 270 degrees with respect to each other. Joint 28, shown in detail in FIG. 2, is attached to the ends of members 20 and 26 using acid core solder or other appropriate solder or adhesive.

Member 26 is generally folded against member 20 when not in use and rotated through 270 degrees to a horizontal position, and extended, for use.

Flexible member 12 is attached to the end of member 26 and acts as a pointer for guiding the driver of the towing vehicle. Member 12 may be 3 in. to 6 in. long or of other dimensions, as necessary for operation of the device. Member 12, which is preferably a flexible, resilient rod or tube which will not scratch the paint of the towing vehicle, may be attached to member 26 adhesively by cutting a slit in the upper end of member 12 and pushing it over the free end of member 26 and securing the flexible member in position using glue or other adhesive.

Flexible member 12 may be colored brightly, such as orange or another highly visible color, to facilitate backing the towing vehicle into place. When member 12 touches the center of the towing vehicle, the driver can generally see that the vehicle is in position for connecting the trailer hitch, since the part of the vehicle touched is on an upper part of the vehicle body, generally the tailgate or trunk. When the towing vehicle is a van having rear windows, member 20 may be positioned at an angle to the vertical so that, in correct position for connecting the trailer hitch, member 12 touches the window in view of the driver.

To facilitate correct positioning, a strip of colored tape may optionally be fastened, e.g. adhesively or magnetically, to the centerpoint of the tailgate or trunk of the towing vehicle. The vehicle and trailer are correctly positioned when flexible member 12 touches this strip of tape.

While the invention has been described with respect to certain embodiments thereof, it will be appreciated that variations and modifications may be made without departing from the spirit and scope of the invention.

What is claimed is:

1. A one-piece trailer alignment guide for aligning a trailer with a towing vehicle including a towing ball member for connecting a trailer hitch comprising:

magnetic supporting means for positioning on a trailer;

a first extensible elongated member extendable higher than a rearward end portion of the towing vehicle;

a ball and socket joint for rotatably connecting said supporting means with a first end of said first elongated member;

a second extensible elongated member capable of extending from the second end of the first elongated member to above the rearward end portion of the towing vehicle substantially above the towing ball member;

means for connecting a second end of said first elongated member with a first end of said second elongated member, said connecting means comprising a joint enabling the second elongated member to be angularly rotated through 270° at said joint; and elongated flexible means for touching the rearward end portion of the towing vehicle substantially above the towing ball member comprising a first end engaged with a second end of said second elongated member.

2. A trailer alignment guide according to claim 1 wherein the flexible member comprises a material selected from the group consisting of rubber and plastic.

3. A trailer alignment guide according to claim 1 wherein the first elongated member comprises means for adjusting the length of said member.

4. A trailer alignment guide according to claim 3 wherein the adjusting means comprises telescoping sections of said first elongated member.

5. A trailer alignment guide according to claim 1 wherein the second elongated member comprises means for adjusting the length of said member.

6. A trailer alignment guide according to claim 5 wherein the adjusting means comprises telescoping sections of said second elongated member.

7. A one-piece trailer alignment guide for aligning a trailer with a towing vehicle having a towing ball member for connecting a trailer hitch comprising:

magnetic supporting means for positioning on a trailer;

a first elongated member comprising telescoping elongated sections extendable higher than a rearward end portion of the towing vehicle;

a ball and socket joint for rotatably connecting said first end of said first elongated member with said supporting means;

a second elongated member comprising telescoping sections capable of extending from the second end of the first elongated member to the rearward end portion of the towing vehicle substantially above the towing ball member;

means for rotatably connecting a second end of said first elongated member with a first end of said second elongated member, and elongated flexible means for touching the rearward end portion of the towing vehicle substantially above the towing ball member comprising a first end engaged with a second end of said second elongated member, said elongated flexible means extending downward from said second elongated member.

* * * * *